Patented Jan. 3, 1950

2,493,604

UNITED STATES PATENT OFFICE 2,493,604

INSULATING PAPER OF ASBESTOS AND BENTONITE

Theodore R. Walters, Pittsfield, Mass., assignor to General Electric Company, a corporation of New York No Drawing. Application November 6, 1944, Serial No. 562,275

2 Claims. (Cl. 92—3)

The present application is a continuation-in-part of my prior application Serial No. 370,807, filed December 19, 1940, now abandoned.

The present invention comprises novel fabricated fibrous material, which is wholly inorganic and in its preferred embodiment is of a paperlike character. It includes also a method of fabricating such material. The new material commonly consists of asbestos and a hydrated colloidal clay, for example bentonite.

Although asbestos is preferred as the mineral fibrous material in the preparation of fabricated products, the asbestos may be partly replaced by mineral wool or other mineral fibers. For convenience I shall refer herein to asbestos as exemplifying the fibrous material.

Paperlike sheet products which are prepared either from a colloidal clay exclusively, or in combination with a minor content of a fibrous filler, are weak mechanically and can not readily be fabricated on a paper machine.

On the other hand, sheet material made wholly of asbestos fiber also is weak mechanically, particularly in tensile strength. In order to improve the mechanical strength, cotton fiber and also starch have been added to asbestos fiber for the manufacture of asbestos paper. Such additions of organic material reduce the fireproof character of the asbestos and limits its value as an electrical insulator.

As a consequence of the present invention, these disadvantages have been overcome. Sheet products are provided consisting preponderantly of asbestos, on the fibers of which a modified agglomerated clay has been deposited. Such products are prepared by being felted on the screen of a paper-making machine in accordance with the process aspect of my invention.

Clay has been used heretofore as a "loading" or "sizing" material in the manufacture of conventional paper for the purpose of improving the "finish" of the paper. However, it is well known that in a paper product the clay addition reduced the tensile strength of the resulting paper.

Also, it has been the general belief in both the asbestos and the electrical industries, that asbestos, because of natural inclusions of iron oxide (magnetite) and conducting salts, is a poor electrical insulator. Although many attempts have been made to overcome this condition, heretofore no solution has been found which made asbestos products available as practical electrical insulation in the high voltage field.

Asbestos products made in accordance with my present invention have higher tensile strength, lesser hydroscopicity, better electrical insulating and thermal characteristics, and longer life than asbestos products heretofore produced.

The main novel feature of my invention is the chemical modification of the colloidal clay with a heavy metal, preferably copper, before the final fabrication step is carried out, and either before or after the admixture of the colloidal clay with the asbestos.

Another feature of my invention consists in restricting the admixture of colloidal clay in the products within the limits of about 5 to 35 per cent.

In the preparation of asbestos products embodying my invention, finely divided and highly purified asbestos fiber is employed which results in a thin, flexible, wholly inorganic paperlike sheet of a quality not heretofore deemed obtainable.

Sheet material embodying my invention may be made by suspending asbestos or other suitable inorganic fibrous material and chemically modified colloidal clay in a relatively large amount of water, and collecting the furnish thus obtained on a filtering medium, such as the screen of a paper-making machine.

In preparing this novel sheet product, the clay is purified and graded by suspension in a large percentage, say 98 parts of water to 2 of clay, and allowing the mixture to settle for about 48 hours. During this time coarse impurities, such as sand and the larger clay particles, settle out leaving a suspension of colloidal fineness.

In some cases it is desirable to subject this colloidal suspension to electro-dialysis to remove impurities tending to depreciate the electrical resistivity of the final product. Preferably, the electro-dialysis also introduces a heavy metal ionogen into the bentonite. Thus, copper or other metal may be introduced during the electro-dialysis purification step referred to above by utilizing a copper or copper alloy anode. For example, a dialyzer, as well known, may comprise three compartments separated from one another by permeable membranes. The two end compartments may be filled with pure water in which the electrodes are immersed. An aqueous suspension of the bentonite to be purified is contained in the middle compartment, a suspension of two or three parts of bentonite in 98 to 97 parts of water being suitable.

When a direct current of sufficiently high voltage (e. g. about 220 volts) is applied to the electrodes to obtain a current density through the water of about .02 ampere per square inch of membrane area, a bentonite gel deposits on the anode membrane which contains a small amount of copper derived from a copper anode. The copper appears to be chemically combined with the bentonite. When a deposit about one-half inch thick is obtained, it is removed for use. A copper content of about 3.3 per cent calculated by reference to the dry weight of the bentonite is desirable.

Modification of the bentonite gel chemically with a sufficiently large amount of copper results in an aggregation or agglomeration of the bentonite so as to permit of the mechanical separation of water from a mixture of fibrous material and such modified bentonite by the application of moderate pressure or vacuum. The copper content decreases the water absorptivity or hygroscopicity of the final dried product.

Alternatively, copper or other metal may be introduced by appropriate methods other than electro-dialysis. For example, the clay may be modified by adding to the aqueous settled suspension of bentonite or the like a solution of a suitable metal compound. Copper acetate is well suited for this purpose. About 1.5 per cent by weight of copper acetate may be added. For instance, to a suspension of 470 parts of bentonite by weight in water (the suspension approximately 4 percent of solids), there may be added 100 parts by weight of a saturated solution of copper acetate.

The suspension of bentonite after agitation for one to two hours to permit ionic interchange to occur is mixed thoroughly with asbestos (prepared as described later) or other desired mineral fiber. The copper acetate alternatively may be added to the aqueous suspension of bentonite after it has been mixed with the asbestos or other fiber.

The metal compound used above described may consist of salts of other metals than copper, such as lead or chromium; and any one of them may be introduced as an acetate or nitrate. However, where the metal is introduced by this method or by electro-dialysis, the introduction of a copper ionogen is preferred. It materially reduces the hygroscopicity of the finished product, particularly upon heat treatment of the dried product.

The fibers of asbestos should be brought to a state of extreme fineness of subdivision before being associated with the modified bentonite. The bundles of fibers which are obtained commercially by crushing crude asbestos ore, should be further processed for satisfactory results according to this invention. This may be done by mechanically subdividing the fibers while suspended in water by the use of an appropriate beating apparatus, such as used in paper-making. Care should be exercised to keep breaking and cutting of fibers down to a minimum. However, fibers as short as two millimeters (about 90 mils) are satisfactory. The subdivision of the fiber bundles should be carried far enough to result in fibers having a maximum diameter of .02 mil. Even finer fibers are advantageous.

When in this fine state of subdivision, washing in pure water which can be done in the beater removes many of the impurities which commonly cause the poor dielectric properties generally associated with asbestos products.

The subdivided asbestos fibers, still in water, should next be passed through a suitable magnetic separator in order to remove magnetic impurities. Unless the fibers are suitably prepared to the proper fineness, this separation is unworkable.

When the clay and fiber have been suitably prepared they are mixed in the relative proportions of 5 to 35 parts of colloidal clay to 95 to 65 parts of asbestos on a dry weight basis. About one-tenth to one per cent of these two ingredients on a dry weight combined basis should be suspended in a large excess of water, that is, in about 99 per cent or more of water.

The percentages of ionogen or electrolyte previously added to the suspension of clay are sufficient to cause agglomeration of the clay on to the fiber, which is decidedly advantageous. It facilitates the formation of the sheet and shortens the drainage time of the suspended material on the filtering screen. The suspension of bentonite and asbestos is collected and separated from water upon a paper-making screen or other suitable filtering medium. The resulting film which is removed from the screen by paper-making technique is dried and then is ready for use. It may be baked above room temperature.

The time required to drain the water from a mixture of asbestos and electrolyte-treated bentonite is materially less than the time required to drain such mixture containing untreated bentonite. Ordinarily, only one-tenth as long a draining period is required. If it should be attempted to collect an aqueous suspension of asbestos and untreated bentonite on the screen of a paper-making machine, a large proportion of the bentonite would pass through the screen, thus becoming ineffective. When asbestos containing bentonite prepared as described is collected however, the loss of bentonite is negligible. The strength of the finished product is increased by the presence of the colloidal clay. The latter constitutes an integral part of the product.

The paperlike products comprising my invention can be applied by winding on individual electrical conductors, or coils, made of a multiple number of conductors. Such conductors or coils may be subjected to impregnation with various kinds of insulating materials in a liquid state.

The paperlike products have sufficient adhesiveness while moist to permit multiple layers of such products to be united into articles of unitary structure. Also, such heavy sheet or plate material which consists of multiple united layers of such membranes may be formed while moist into desired structures having angles, channels, etc., by ordinary mechanical operations such as pressing or rolling. Such composite articles upon removal of moisture may be fabricated in desired form by ordinary mechanical operations such as cutting or sawing without disintegration of the component parts. For the purpose of forming such heavy plate stock, I prefer to employ asbestos-bentonite sheet material containing about 30 per cent bentonite.

Inorganic heat-resisting tape or other sheet material made as herein described may be employed advantageously for wrappings on transformer coils or similar electrical apparatus which is operated while immersed in a body of nonsludging, heat-resisting liquid, for example, a suitable mixture of chlorinated diphenyl and chlorinated benzene such as described in U. S. Letters Patent 1,931,455. An electric transformer thus insulated and submerged in heat-resisting liquid may be operated at temperatures above the maximum of 100° C. heretofore imposed on such apparatus when insulated with conventional cellulosic insulation.

The resistance to chemical deterioration of the described asbestos-clay products is very high. Chemically they are unaffected by the liquid chlorinated compounds and whatever impurities may be contained in the latter or develop during use. For this reason the combination of these insulation elements is very advantageous in electric apparatus.

While my new product is adapted particularly for the electrical insulation field, it can be used in other fields; for example, it may be employed in place of cellulosic paper for various purposes, even for the inscribing of records. Its resistance to deterioration by high temperatures renders it more permanent than ordinary cellulosic paper in fields or locations where high temperatures are involved either continuously or occasionally.

What I claim as new and desire to secure by Letters Patent of the United States is:

1. A thin, flexible, insulating, inorganic paper having a sufficiently high tensile strength and flexibility to be wrapped on electric conductors and being capable of being folded upon itself without breakage, said paper consisting by weight of 5 to 35 parts bentonite and 95 to 65 parts asbestos fibers which are devoid of soluble impurities and conducting particles and which have a maximum diameter of 0.02 mil, said bentonite being associated with a sufficient amount of a water-soluble salt selected from the class consisting of the acetates and nitrates of copper, lead and chromium to cause the bentonite particles to agglomerate upon and adhere to the asbestos fibers, the said paper being stronger than a similar paper free of bentonite.

2. A thin, flexible, inorganic paper obtained by depositing on a paper making screen a mixture of asbestos fibers and bentonite from an aqueous suspension or slurry thereof, said paper being capable of being folded upon itself without breakage and consisting by weight of 5 to 35 parts bentonite and 95 to 65 parts asbestos fibers which have a maximum diameter of 0.02 mil, said bentonite being modified by a sufficient amount of a water-soluble salt selected from the class consisting of the acetates and nitrates of copper, lead and chromium to cause the bentonite particles to flocculate and agglomerate upon and adhere to the asbestos fibers thereby to facilitate the removal of water from the mixture of asbestos fibers and bentonite as deposited on the paper-making screen.

THEODORE R. WALTERS.

REFERENCES CITED

The following references are of record in the file of this patent:

UNITED STATES PATENTS

| Number | Name | Date |
|---|---|---|
| 1,419,951 | Acheson | June 20, 1922 |
| 1,554,919 | Mosely | Sept. 22, 1925 |
| 1,581,618 | Sulzberger | Apr. 20, 1926 |
| 1,841,678 | Russell | Jan. 19, 1932 |
| 1,887,726 | Weber | Nov. 15, 1932 |
| 1,943,584 | Cross | Jan. 16, 1934 |
| 2,248,636 | Marsden | July 8, 1941 |
| 2,266,636 | Hauser | Dec. 16, 1941 |
| 2,266,637 | Hauser | Dec. 16, 1941 |
| 2,266,638 | Hauser | Dec. 16, 1941 |
| 2,283,174 | Bates | May 19, 1942 |
| 2,317,685 | Hauser | Apr. 27, 1943 |
| 2,368,635 | Booth | Feb. 6, 1945 |
| 2,373,914 | Quinn | Apr. 17, 1945 |

FOREIGN PATENTS

| Number | Country | Date |
|---|---|---|
| 37,900 | Germany | Dec. 2, 1886 |

OTHER REFERENCES

Technical Association Papers, Series 20, pp. 360–362. 376–378.